US008769434B2

(12) United States Patent
Hoffman

(10) Patent No.: US 8,769,434 B2
(45) Date of Patent: Jul. 1, 2014

(54) INTELLIGENT DISPLAY OF INFORMATION IN A USER INTERFACE

(75) Inventor: Michael T. Hoffman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 304 days.

(21) Appl. No.: 12/854,283

(22) Filed: Aug. 11, 2010

(65) Prior Publication Data

US 2012/0042280 A1  Feb. 16, 2012

(51) Int. Cl.
*G06F 3/14* (2006.01)
*G06Q 30/02* (2012.01)
*G06F 17/30* (2006.01)

(52) U.S. Cl.
CPC ...... *G06F 17/30867* (2013.01); *G06Q 30/0251* (2013.01)
USPC .............. 715/800; 715/744; 705/26.1; 482/8; 463/25

(58) Field of Classification Search
USPC .......... 715/200–277, 700–867; 700/701–866; 709/201–229; 705/26.1, 50–79; 345/30–111; 482/8; 463/25
See application file for complete search history.

(56) References Cited

U.S. PATENT DOCUMENTS

| | | | |
|---|---|---|---|
| 7,353,234 B2 * | 4/2008 | Kimball et al. | 1/1 |
| 7,660,815 B1 | 2/2010 | Scofield et al. | |
| 7,925,548 B2 * | 4/2011 | Alger et al. | 705/26.1 |
| 7,985,134 B2 * | 7/2011 | Ellis | 463/25 |
| 8,162,804 B2 * | 4/2012 | Tagliabue | 482/8 |
| 2008/0064490 A1 * | 3/2008 | Ellis | 463/25 |
| 2009/0187467 A1 | 7/2009 | Fang et al. | |
| 2009/0313550 A1 * | 12/2009 | Kim et al. | 715/744 |

FOREIGN PATENT DOCUMENTS

| | | |
|---|---|---|
| EP | 2128776 A1 | 2/2009 |
| JP | 2003-030403 A | 1/2003 |
| JP | 2006-215925 A | 8/2006 |
| JP | 2008-519370 | 6/2008 |
| JP | 2010-016521 A | 1/2010 |
| JP | 2010-166167 A | 7/2010 |
| JP | 2011-508925 | 3/2011 |
| JP | 2011-528153 | 11/2011 |
| WO | 2009-126818 A2 | 10/2009 |

OTHER PUBLICATIONS

International Search Report and Written Opinion for application No. PCT/US2011/047260 mailed Nov. 3, 2011.
European Office Action for application No. 11750007.4 mailed Jan. 6, 2014.
Notification of Reason for Refusal for Japanese patent application No. 2013-524206 mailed Jan. 14, 2014.

* cited by examiner

*Primary Examiner* — Ruay Ho
(74) *Attorney, Agent, or Firm* — Banner & Witcoff, Ltd.

(57) ABSTRACT

User interfaces such as web pages may be customized in terms of appearance and content based on user interests. For example, information items may be arranged such that items corresponding to strong user interests are displayed in more visually identifiable locations while items corresponding to weaker user interests are displayed in less visually valuable positions. The size of and space allocated to the information items may also be customized based on the relative strengths of the corresponding interests. For example, information associated with a strong user interest may be allotted 50% of the user interface. Other visual characteristics of the user interface and the information items such as font size/style, color, transparency and the like may also be customized to reflect the importance or strength of corresponding user interfaces.

20 Claims, 11 Drawing Sheets

REGION CUSTOMIZATION

Information Source: — 615

Region resize allowances: — 619

- [X] Newspaper 1
- [ ] Gaming Site Z  } — 621
- [X] NFL Website
- [+] Add a source... — 623

Width  + % / - %
Height + % / - %

Information Type: — 617

- ○ Choose a specific type: [Calendar data ▷]
- ● Choose a general topic: [Lacrosse ▷]
- ○ Surprise me!

625a
625b
625c

613

[Default] [Clear]
[Submit]

*FIG. 6B*

INTELLIGENT DISPLAY OF INFORMATION IN A USER INTERFACE

BACKGROUND

User interfaces such as web pages often have the same arrangement and/or information regardless of the user visiting the page. In some arrangements, personal sites or accounts on network servers may provide individualized information, but present the information in the same visual arrangement and manner. Accordingly, a user may be presented with information in an arrangement or manner that emphasizes content that is of little to no interest to the user. The user may be required to navigate the user interface to identify the items that are of stronger interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more aspects of the present disclosure relates to automatically customizing web pages or other types of user interfaces according to user interests. For example, a personal athletic activity monitoring web page may include information that is relevant to a user's interest. The information may be selected based on interests identified from the user's profile. A user's profile may include a browsing history or other on-line activity history, a workout history, shopping history, listing of friends, friends' activities, memberships in social communities, user location, devices used, browsing device attributes, type and capabilities, and/or combinations thereof. Information items may be automatically selected based on a strength of the user interest. Accordingly, an information item corresponding to a first user interest may be selected over an information item corresponding to a second user interest if the first interest is stronger than the second. Alternatively or additionally, information items or types thereof may be user selected based on a user-specific topic or search term, an information source (e.g., a newspaper, a newspaper column, an author, a website, etc.) and/or combinations thereof. In one or more arrangements, the information items may be partially selected by a user and partially selected by an automated system.

According to another aspect, the user interface may automatically be arranged according to a user's interests. For example, information items corresponding to stronger user interests may be presented or displayed in higher visibility or valued locations in the user interface. In one arrangement, the top of the user interface may be considered to have higher value or visibility than a location toward the bottom of the interface. Alternatively or additionally, a center location of the interface may have more emphasis than a corner of the interface. In one or more configurations, a user may designate at least a portion of the arrangement of the user interface. For example, a user may specify where to place information items relating to certain topics. A remaining portion of the user interface arrangement may be automatically defined. Additionally, a user may specify the level of importance or value of one or more portions of the user interface.

According to another aspect, a user may be assessed for generation of a user interface based on a variety of information including actual athletic performance of the user (e.g., speed, heart rate, distance, workout frequency, etc.), nature and mix of athletic activities performed, a state of a device or product (e.g., wear of a shoe, battery life, etc.), use of devices (e.g., to count calories rather than distance may be indicative of dieting versus performance improving) and/or combinations thereof.

According to yet another aspect, information items may be allocated space (or size) in the interface based on a strength of the user interest. Accordingly, if the interest is a relatively weak interest, a smaller amount of space in the interface may be allocated to a corresponding information item. In one or more arrangements, allocations may be predefined. For example, information items corresponding to the strongest user interest may be allotted 50% of the interface while the second strongest user interface may be allotted 25% of the interface. The size allocations may be user configured, system defined and/or combinations thereof.

Other customization features may be used including modifying colors, transparency, font sizes, font styles, borders and the like to represent importance or strength of user interest.

According to yet another aspect, a template for arranging information items in a user interface may be selected. Templates may be predefined by a user, by an automated system or a combination thereof. The templates may be selected based on a variety of considerations including user preferences, user profile information (e.g., gender, location, number of interests), types and/or attributes of information items to be displayed, number of information items to be displayed, type of devices used, type of device on which the interface is being displayed, display size, bandwidth availability, device capabilities, user location and the like. Templates may be defined into information zones within which, other templates (e.g., sub-templates) may be applied. Sub-templates may then define portions for individual information items.

BRIEF DESCRIPTION OF THE DRAWINGS

Certain embodiments are illustrated by way of example and not limited in the accompanying figures in which like reference numerals indicate similar elements and in which:

FIGS. 6A-6C illustrate example templates and sub-templates that may be used to arrange information items in a user interface according to one or more aspects described herein.

DETAILED DESCRIPTION

Figure 1:
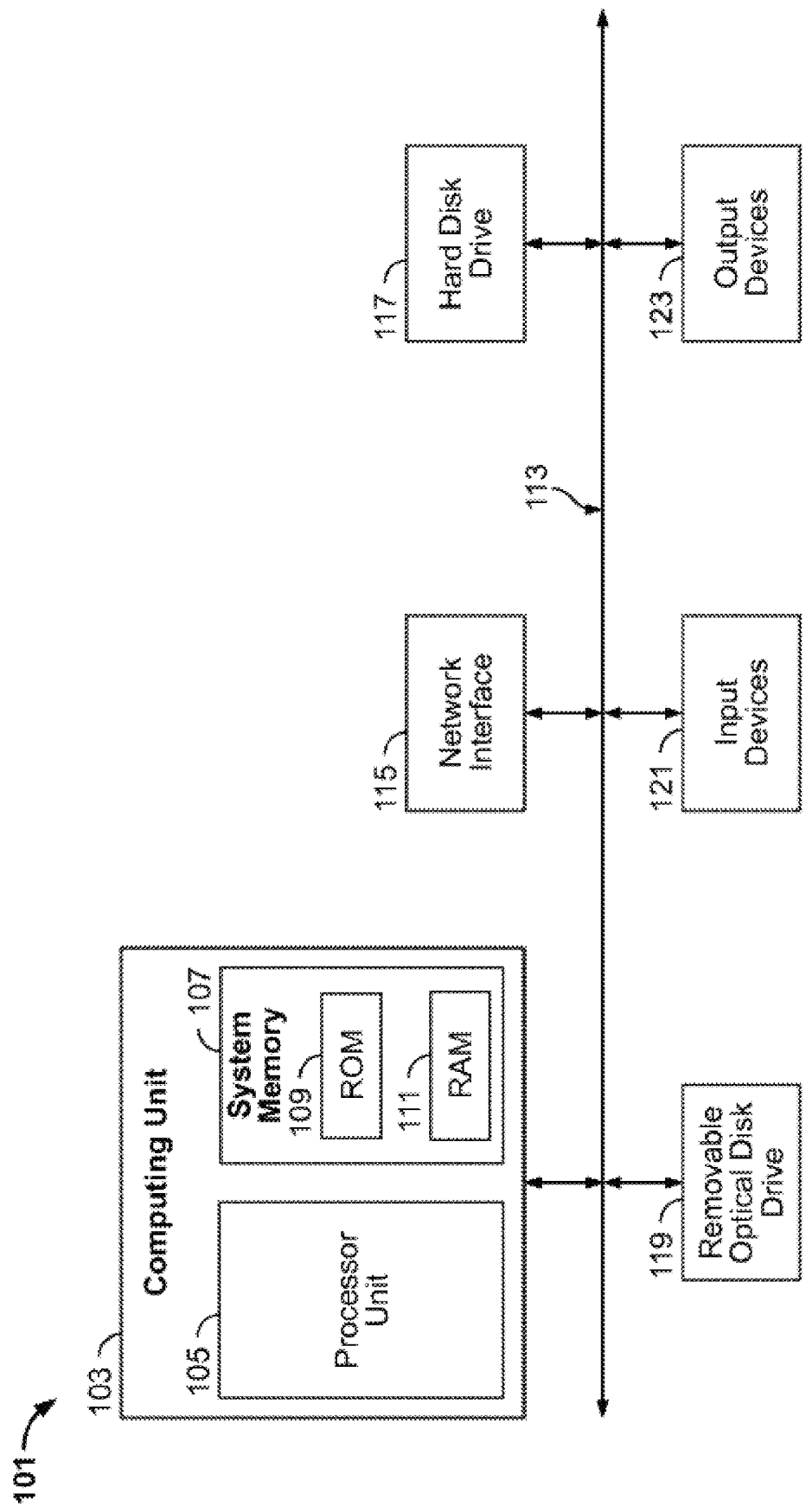
FIG. 1 illustrates a system of an embodiment according to one or more aspects described herein.

Embodiments of the present disclosure relate to an intelligent user interface for displaying various types of information. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as described herein.

Various aspects of the present disclosure may be implemented using electronic circuitry configured to perform one or more functions. For example, with some embodiments of the invention, an on-line browsing device, an athletic activity monitoring device, a display device, a network server or any combination thereof may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Accordingly, FIG. 1 shows one illustrative example of a computer 101 that can be used to implement various embodiments of the invention. As seen in this figure, the computer 101 has a computing unit 103. The computing unit 103 typically includes a processing unit 105 and a system memory 107. The processing unit 105 may be any type of processing device for executing software instructions, but will conventionally be a microprocessor device. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure to one or more peripheral devices. For example, the processing unit 105 or the system memory 107 may be directly or indirectly connected to additional memory storage, such as the hard disk drive 117, the removable optical disk drive 119. Computer 101 may further use or interface with other memory storage mediums such as solid state drives, removable magnetic disk drives and flash memory cards. The processing unit 105 and the system memory 107 also may be directly or indirectly connected to one or more input devices 121 and one or more output devices 123. The input devices 121 may include, for example, a keyboard, touch screen, a remote control pad, a pointing device (such as a mouse, touchpad, stylus, trackball, or joystick), a scanner, a camera or a microphone. The output devices 123 may include, for example, a monitor display, television, printer, stereo, or speakers.

Still further, the computing unit 103 may be directly or indirectly connected to one or more network interfaces 115 for communicating with a network. This type of network interface 115, also sometimes referred to as a network adapter or network interface card (NIC), translates data and control signals from the computing unit 103 into network messages according to one or more communication protocols, such as the Transmission Control Protocol (TCP), the Internet Protocol (IP), and the User Datagram Protocol (UDP). Network adapters may be wireless or wired or combinations thereof. These protocols are well known in the art, and thus will not be discussed here in more detail. An interface 115 may employ any suitable connection agent for connecting to a network, including, for example, a wireless transceiver, a power line adapter, a modem, or an Ethernet connection. Connection agents may similarly be wireless or wired or a combination thereof. Accordingly, using interface 115, computer 101 may be able to access wide area networks such as the Internet in addition to local area networks. In one or more arrangements, a user may browse websites or other network devices through a local or wide area network using interface 115. Data such as athletic activity and browsing activity may be transmitted to or received from local or remote network sources (not shown).

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player available from Apple, Inc. of Cupertino, Calif. As known in the art, this type of digital music player can server as both an output device for a computer (e.g., outputting music from a sound file or pictures from an image file) and a storage device. In addition, this type of digital music player also can serve as an input device for inputting recorded athletic information, as will be discussed in more detail below. Connections and interfaces may be wireless, wired or combinations thereof.

In addition to a digital music player, the computer 101 may be connected to or otherwise include one or more other peripheral devices, such as a telephone. The telephone may be, for example, a wireless "smart phone." As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with the computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to the computing unit 103. For example, with many computers, the computing unit 103, the hard disk drive 117, the removable optical disk drive 119 and a display are semi-permanently encased in a single housing. Still other peripheral devices may be removably connected to the computer 101, however. The computer 101 may include, for example, one or more communication ports through which a peripheral device can be connected to the computing unit 103 (either directly or indirectly through the bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, the computer 101 may include a wireless data "port," such as a Bluetooth interface, a Wi-Fi interface, an infrared data port, or the like.

It should be appreciated that a computing device employed according various examples of the invention may include more components than the computer 101 illustrated in FIG. 1, fewer components than the computer 101, or a different combination of components than the computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

According to one or more aspects, a computing device such as computer 101 may track a user's on-line and off-line behavior including sites that the user browses, products the user purchases, sports the user plays, events attended by the user and the like. In one example, computer 101 may comprise a network server that hosts one or more web sites for allowing such a user to store personal information and for identifying and providing information of potential interest to the user. In some arrangements, the network server may host an athletic activity monitoring site for tracking the user's athletic activity. In another arrangement, the network server may host an on-line store that aids the user to selecting and purchasing items. In still other arrangements, the network server may host a combination of athletic monitoring and on-line store functions. In any of these arrangements, the network server may identify additional information such as upcoming events, advertisements for products or services, articles and the like that may be relevant to the user's interests.

Figure 2:
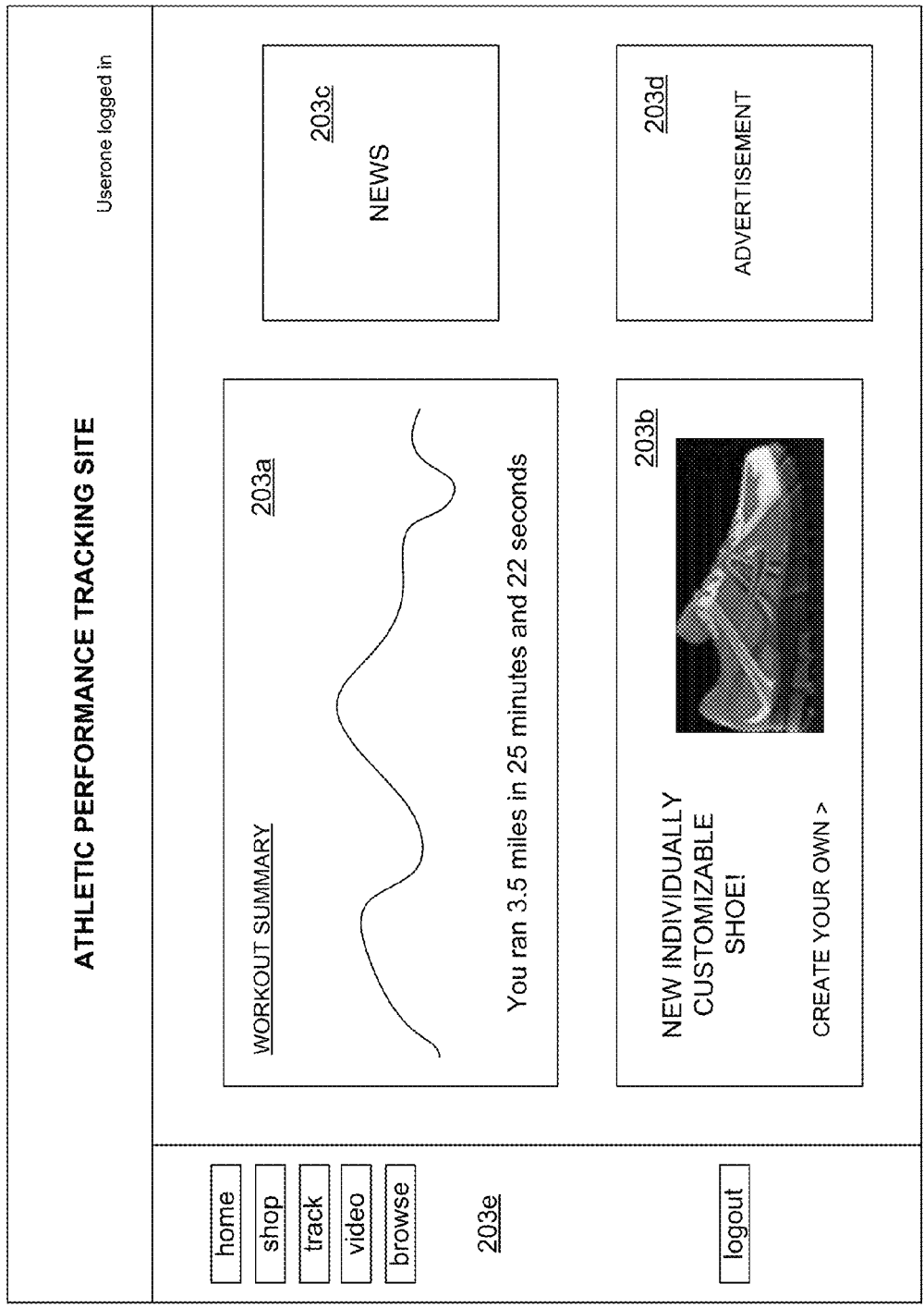
FIG. 2 illustrates an example user interface in which multiple information items are displayed.

FIG. 2 illustrates a user interface that provides information for a particular user (i.e., userone). To access interface 200, a user might be required to initially authenticate his or her identity using a login name and password. Once authenticated, interface 200 may be generated with multiple information portions 203. For example, portion 203*a* may provide a user athletic performance summary for the previous day, week or other predefined period of time while portion 203*b* may provide information introducing a shoe product. News and events may be displayed in portion 203*c* while advertisements may be provided in portion 203*d*. Additionally or alternatively, a navigation menu may be provided in portion 203*e* of interface 200 to allow a user to navigate to other interfaces and pages of information.

The information displayed in one or more of portions 203 may be selected based on user interests. For example, shoe information displayed in portion 203*b* may be selected based on determining that the user has an interest in running. Additionally or alternatively, the shoe displayed in portion 203*b* may be specific to an athletic sport or activity that the system has determined is of interest to the user. Similarly, articles, news, advertisements and athletic performance information may be selected for display in one or more of portions 203 based on identified user interests. User interests may be defined by the user (e.g., in a user profile) or automatically determined based on a user's behavior, activity, browsing history and the like. In one example, a user may upload athletic activity data such as a type of activity performed, a duration of the activity, a number of calories burned, a number of miles run, a number of steps taken and the like. Based on the uploaded athletic activity data, a system may determine that a user's preferred athletic activity is running, walking, using an elliptical and the like. In another example, if a user's browsing history determined based on a user's browsing cookies reveals that the user often shops for or views information about tennis rackets, the system may identify tennis as a user interest. Other non-sports or athletic activity related interests may similarly be identified.

Based on the relative strengths of the user interests (the determination of which is described in further detail below), user interface 200 may be customized so that information portions that relate to strong user interests are displayed in a first manner and information portions relating to weaker user interests are displayed in a second manner. For example, strong user interests may be allocated larger amounts of space in interface 200 and be provided with more prominent placement (e.g., center, top, etc.). The strength of a user interest may further affect the size and style of the font used, color scheme, borders (or lack thereof), a transparency level and/or combinations thereof. Various other appearance characteristics may also be modified based on interest strength. Customizing a user interface based on user interests and other profile information may allow different information to be presented to each user or the same information to be presented in different arrangements.

Figure 3A:
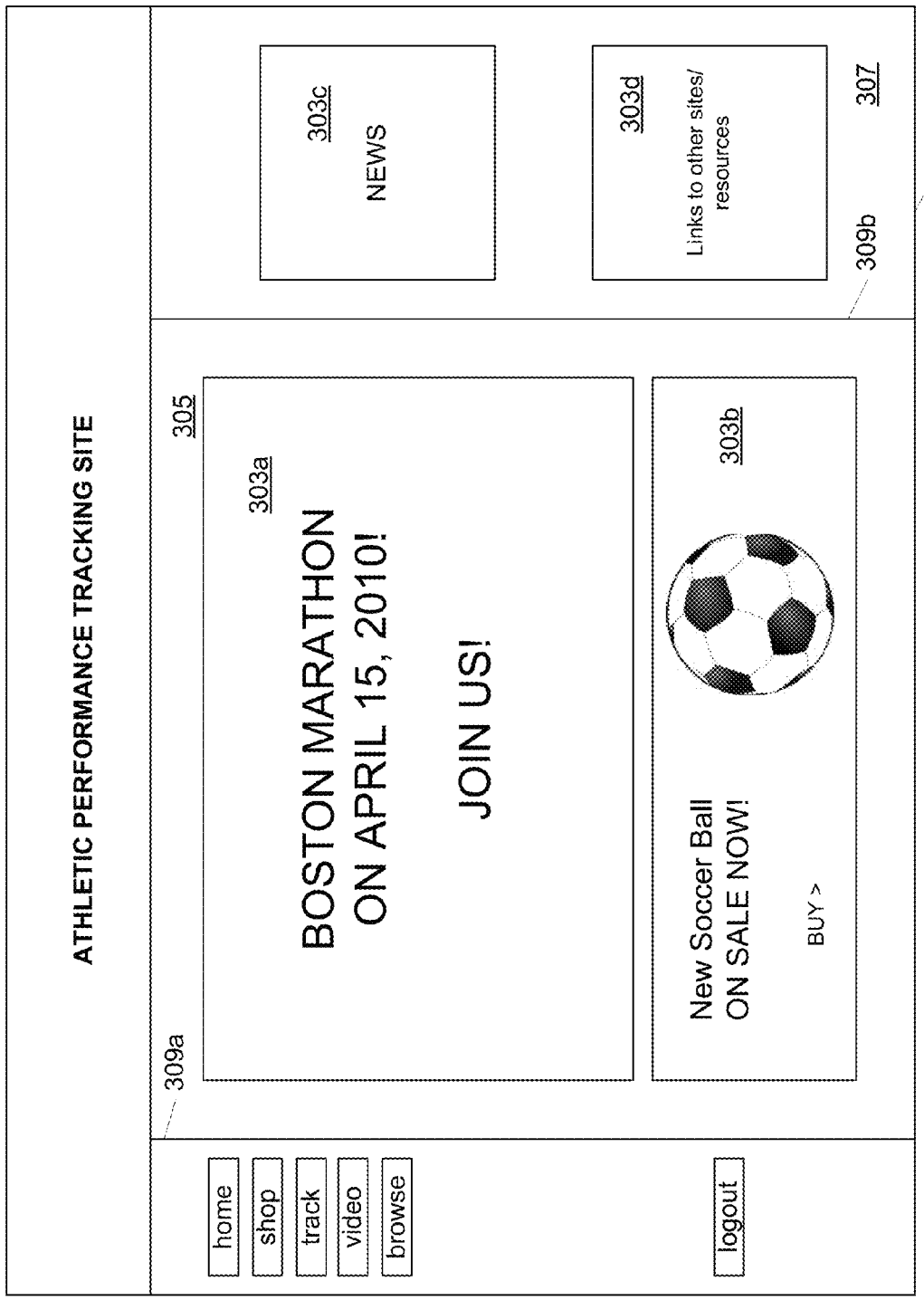
FIGS. 3A & 3B illustrate example user interfaces that are customized according to user interests according to one or more aspects described herein.
Figure 3B:
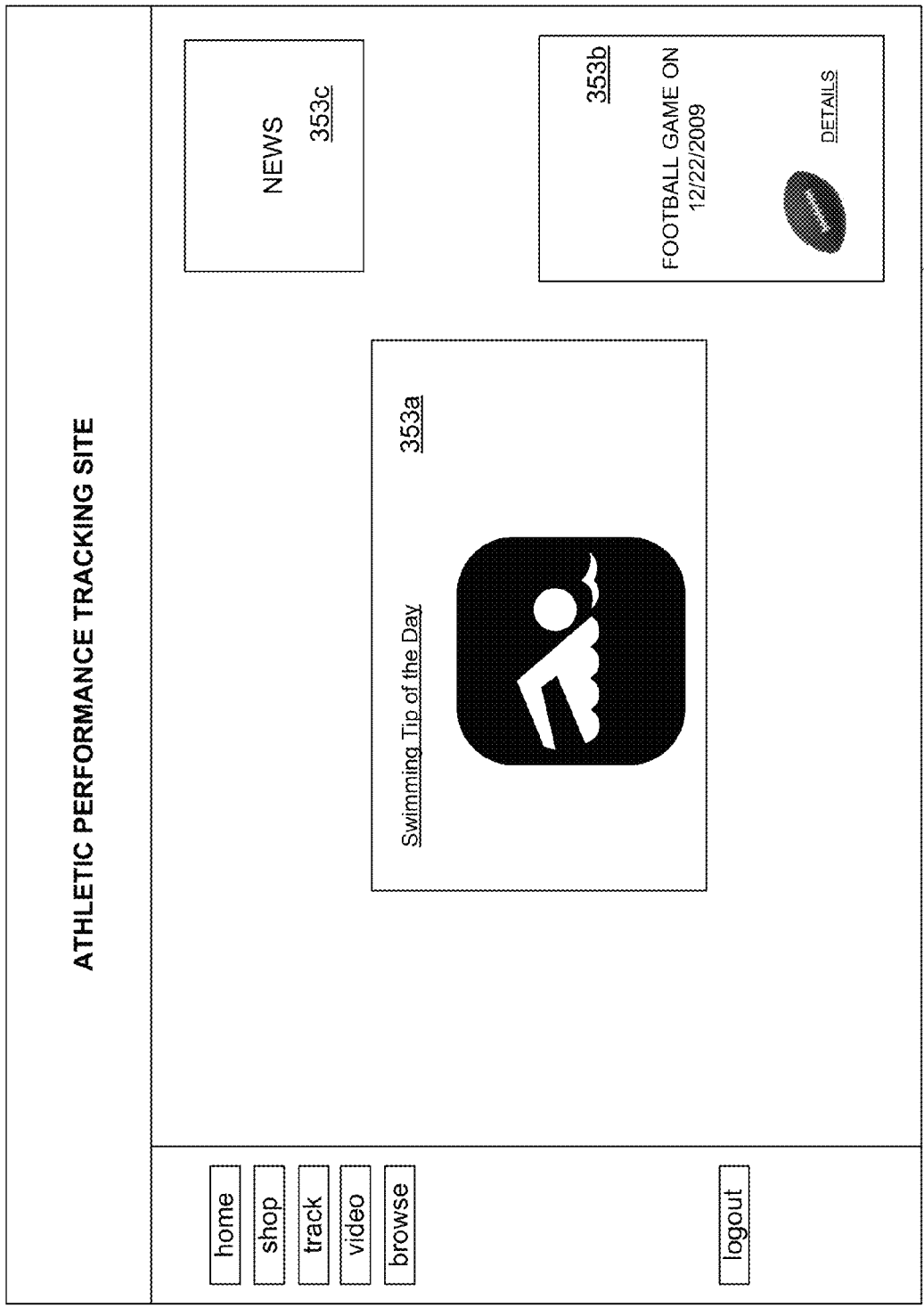

FIGS. 3A and 3B illustrate example interfaces 300 and 350, respectively, where different user interests are displayed in a top center location. Interface 300 of FIG. 3A, for example, may be displayed for a user that has a strong interest in running and a weaker interest in soccer. Accordingly, portion 303*a* displaying information regarding an upcoming running event may be displayed in larger font and may occupy more space in interface 300 than portion 303*b* advertising a new soccer ball product. For example, information included in portion 303*a* may be displayed in 20 pt. font while occupying twice the amount of space that portion 303*b* is allocated. Additionally, information in portion 303*b* may be displayed in 14 pt. font to indicate a lesser importance or weaker user interest. Portion 303*a* may also be placed in a more prominent location such as a top half of interface 300. Additionally or alternatively, interface 300 may be divided into frames or regions by delineators 309*a* and 309*b*. Thus, various areas such as area 305 may be considered more valuable than other areas such as area 307 since area 305 is more centrally located than area 307. Accordingly, information portions, such as portions 303*c* and 303*d* that are shown in area 307, may be placed in area 305 rather than area 307 if a corresponding user interest is of a sufficient strength. If, on the other hand, the corresponding user interest does not meet a specified strength, the portion may be placed in a less valuable area. For instance, portion 303*b* may be displayed in area 307 rather than prominently displayed in area 305 as shown in FIG. 3A.

In interface 350 of FIG. 3B, portions 353*a* and 353*b* may illustrate that a user has a stronger interest in swimming and a weaker interest in football. Accordingly, portion 353*a* may be displayed in a substantially central location of interface 350 under the assumption that a user's focus will normally be drawn to the center of the interface. Information relating to football may be displayed in portion 353*b* which is positioned in one of the corners of interface 350. Another information portion 353*c* may further be included and occupy even less space than either portions 353*a* and 353*b* indicating that the information in portion 353*c* relates to an interest that is of less significance or strength than either football or swimming. Additional information items and interests may be provided in interface 350 as required or desired by a user or system operator. Additionally or alternatively, multiple information portions may be directed to the same interest. In such arrangements, the information items for portions directed to the same interest may be displayed in similar fashion (e.g., sharing/splitting a central portion of the interface or displayed in interface portions having the same size, having similar fonts or font sizes, etc.).

Figure 4:
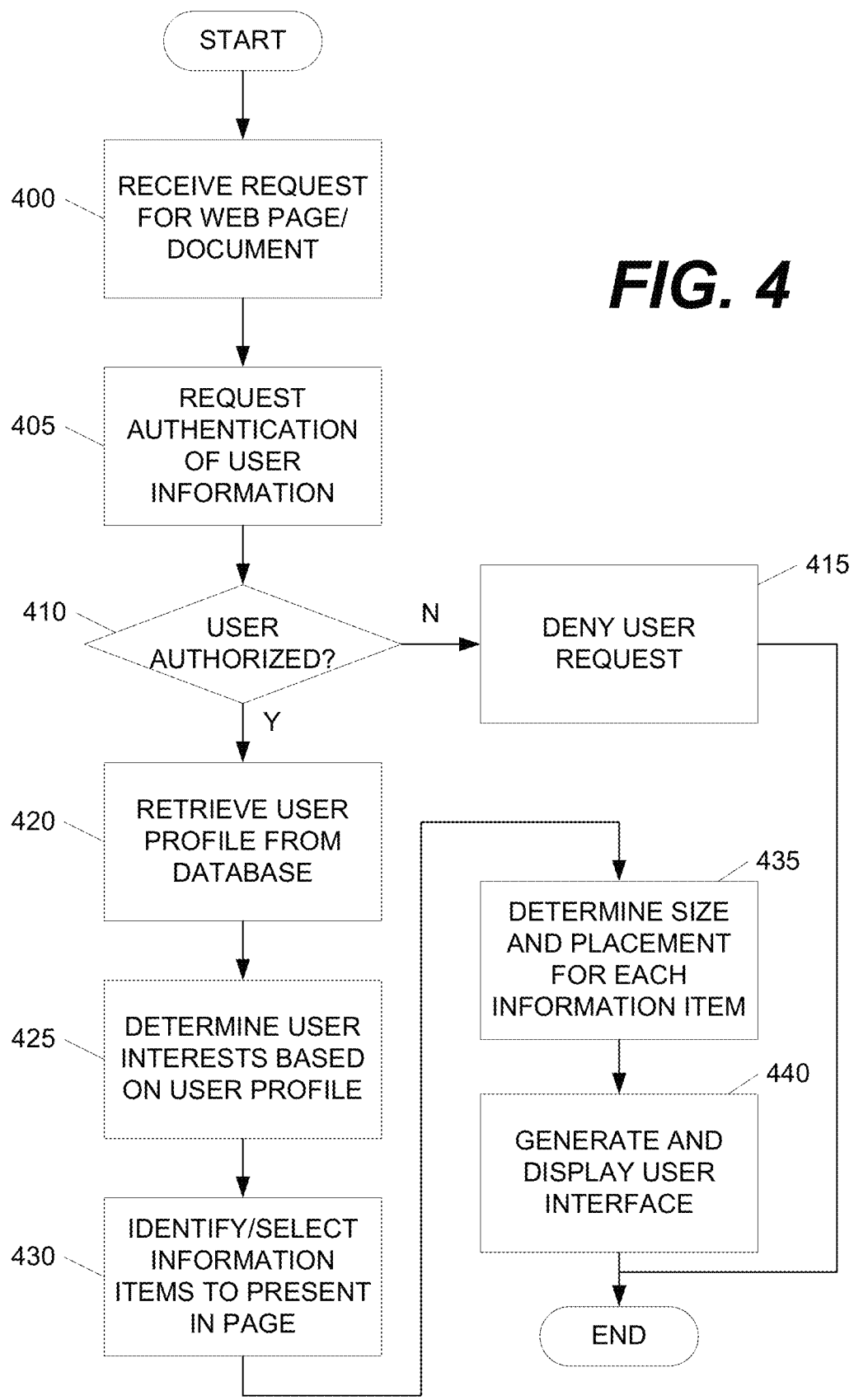
FIG. 4 is a flowchart illustrating a method for automatically generating a user interface that is arranged according to user interests.

FIG. 4 is a flowchart illustrating a method for determining an appearance of one or more portions in a user interface. In step 400, a network server may receive a user request for a personal web page for an athletic performance monitoring site. For example, the request may comprise an HTTP GET request directed toward the network server hosting the personal web page. In response, the system may ask the user to authenticate his or her identity in step 405 by entering user information such as a login name and a password. In one or more arrangements, the system may provide a form for entry of the user information. In step 410, the system may determine whether the user is authorized to view the requested web page by comparing the submitted user information with registered user credentials. If the user is not authorized, the system may deny the request in step 415. The system may, in some instances, provide the user with multiple opportunities to provide the correct authorization information before denying the request.

If, on the other hand, the system determines that the user is authorized (e.g., based on verifying the submitted user information), the system may retrieve a user profile from a database in step 420. The user profile may include information such as user preferences, a user's browsing history, athletic activity data, shopping history, friends list and the like. In step 425, the system may determine one or more user interests based on the information stored in the user profile. The user profile may be manually created, automatically generated based on user activity or a combination thereof. For example, the system may parse through metadata keywords used in websites the user has visited, product names or categories from which a user has purchase items, types of athletic activity performed and equipment used. An interest may be identified if a frequency of the keyword, product name, product category, exercise type or athletic equipment is greater than a threshold frequency. Thus, if a user visits football websites more than 5 times a week and that the user plays football at least once a week, the system may determine that football is a user interest. Various algorithms for determining user interests may be used. Alternatively or additionally, the user may specify their interests manually.

Using the user profile information and determined user interests, the system may subsequently identify and/or select information to present in the user interface in step 430. For example, the information may be selected from a news feed database, a product catalog, an advertisement database, an events database and the like. In one or more arrangements, the system may select a number of information items based on a space limitation defined in a user interface template. According to one or more arrangements, information selected for display in the user interface may be selected by a user. For example, a user may specify a set of desired topics to be displayed in the user interface. The user may further set fuzzy parameters such as setting a preference that at least a third of the information items or interface portions of the interface is related to football. Furthermore, a remainder of the interface that is not user specified may be automatically defined by the system. Alternatively or additionally, content may be selected based on a variety of factors including time of day, date, geographic location and/or combinations thereof. In one example, geographic location may be determined based on a user's Internet Protocol (IP) address or using a geographic location determination device (e.g., GPS). Time of day, date and geographic location may allow the system to select information items that are more relevant in terms of time or location (e.g., events occurring close to the user may be selected over events occurring far away in terms of distance or time).

According to yet another aspect, information items may be selected based on other characteristics or attributes including the frequency or amount of time a user uses a particular feature of a device. For example, if a user uses a coaching feature on a digital music playing device frequency, a system may be more inclined to identify information items focused on coaching. Other types of attributes that may affect the selection of content items include device or equipment status information (e.g., battery about to be worn out, equipment about to break). For example, if a user shoe indicates that it is or is close to being worn-out, the system may select advertisements or recommendations for shoes for display in the interface. Further information item selection attributes and factors may include a user's preferred mode of communication (e.g., visual, auditory, textual, kinesthetic) and/or a user's membership and usage patterns in various communities or groups such as FACEBOOK, TWITTER, university groups, sports team fan groups and the like. Such information may be used to determine a mode of communicating information items. For example, if a user prefers visual communication, information items may be presented using video rather than text.

In step 435 the system may determine a size and placement location for each of a number of interface portions allocated for displaying the selected information items. The size and placement location may be determined based on a relative strength of each user interest. Determining a strength of a user interest is further described below with respect to FIG. 5. Other characteristics of each interface portion such as a font size, color, font style, transparency and borders may also be automatically selected in step 435. Alternatively or additionally, the size, placement and other characteristics of the interface portions may be user-specified. For example, the user may specify that an interface portion displaying soccer information is to be placed in a more prominent location (e.g., center top) while an interface portion displaying swimming related information is to be placed in a less important location (e.g., lower right). In another example, the size, placement and other characteristics of the interface portions (or information to be displayed therein) may be defined in a hybrid manner. That is, a user may select the size, placement or other characteristics of a first set of interface portions while the size, placement and/or other characteristics of the remaining interface portions are automatically defined by the system according to an algorithm (e.g., strength of interest). Accordingly, a portion of the interface may be user defined/designed while a remainder may be automatically arranged/defined by a system.

In step 440, the user interface may be displayed with the interface portions in their determined sizes and locations. The above methods and features are not limited to athletic activity monitoring pages or sites and may also be used with other types of interfaces, websites and documents. According to one or more aspects, different placement, size or other characteristic defining algorithms may be used depending on the device with which the interface is being viewed. Accordingly, a first algorithm defining a first set of interface portions may be used when an interface is being viewed on a desktop computer while a second algorithm defining a second set of interface portions may be used when the interface is being viewed on a mobile communication device such as a smart phone or cellular phone. Other variables and factors that may be considered when selecting information items for display and defining the characteristics of the display portions include available bandwidth, interface viewing application capabilities and device screen size. For example, if a user device is connected to a network having low bandwidth or if the device has a small screen size, video or high resolution images might not be selected for display in the interface. In another example, if the user device viewing application does not have ADOBE FLASH capabilities, content requiring FLASH support might not be selected.

Figure 5:
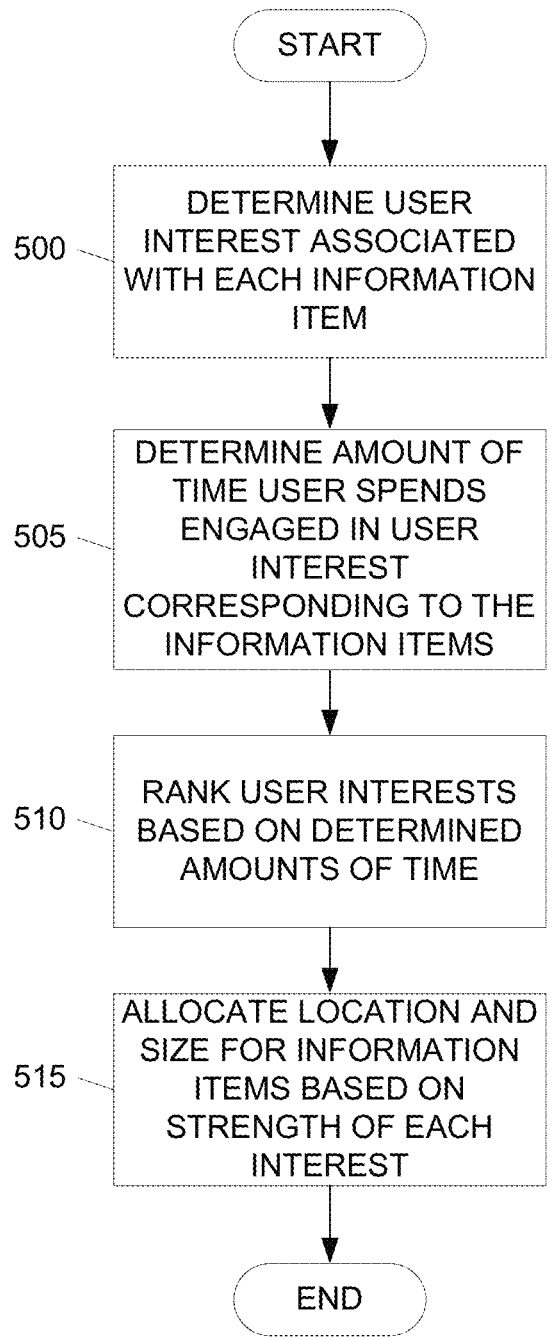
FIG. 5 is a flowchart illustrating a method for determining and ranking user interests according to one or more aspects described herein.

FIG. 5 is a flowchart illustrating a method for generating a customized user interface including multiple information portions. In step 500, a user interface generating system may determine a user interest associated with each information item to be displayed in the user interface. The user interest might already be identified if the information items were selected based on a user's interests as described in FIG. 4. In step 505, the system may determine an amount of time the user spends browsing or engaging in the user interest. For example, the system may calculate the total amount of time a user spends running or researching running events or running products. In another example, the system may calculate the total amount of time a user plays baseball and spends purchasing baseball goods. Once the amount of time has been calculated for each user interest, the system may determine the strength of each interest and rank them based thereon in step 510. Accordingly, in one arrangement, the interest with the highest amount of time spent may be assigned the highest rank (e.g., indicating strongest interest) and the interest with the lowest amount of time spent may be assigned the lowest rank (e.g., indicating the weakest user interest).

In one or more arrangements, other metrics in addition to or as an alternative to time may be used to measure user interest and to generally assess a user. For example, types of purchases, amount of purchases, devices used, workout measure (e.g., calories, steps, distance, time), type of workout and the like may be used to determine user interest. The various types of metrics may be converted into a common unit based on various conversion rules (e.g., $1=5 common units while 1 calorie=2 common units). Thus, activities indicative of a preference for running may be summed using the common unit. In some instances, the type of device used may be assigned a value as well if the device is indicative of a preference for a particular type of activity or topic.

In step 515, the system may allocate location and size based on the strength of each interest with which the information items are associated. According to one or more aspects, location and size allocation may be predefined for each user interest level. For example, the system may have been predefined to place information items associated with the strongest user interests in the middle or at the top of the interface. Furthermore, the system may specify that information items corresponding to the weakest user interest must be half the size of the information items corresponding to the strongest user interest. The size requirements/limitations for information items of intervening user interest levels may be interpolated based on the number of interests. Size and location requirements may be predefined based on the number of information items to be displayed.

Additional or alternative factors may be used in determining a strength of a user interest. For example, an interface generating system may, in addition to or instead of using a total amount of time engaged in an interest, consider a number of products relating to the user interest that have been purchased, a number of friends that share the user interest, a number of unique sites relating to the interest that the user has bookmarked or has browsed, a number of times a user follows links relating to the interest and the like. Furthermore, interests might only be identified if user activity corresponding to the interests meets a predefined threshold of activity. For example, visiting squash websites twice in the past month might not satisfy the threshold for determining that squash is a user interest.

Information items may be selected for display in an interface from a variety of sources. In one or more configurations, a user, a system or other entity may define a preferred or required allocation of information sources. For example, a user may specify that 70% of information items are to be obtained from a first information source while the other 30% of information items may be obtained from a second information source. In another example where the interface is provided by a particular organization or company, the organization may require that the organization is the source of at least 50% of information items displayed in the interface. The organization might not place any specific source requirements on the remaining information items. The allocation requirements or preferences may further specify the sources that may be used for particular information portions. Thus, in one example, a user may specify that a top row of information portions display information from a particular information source. Information item selection may also be based on events such as product launches, upcoming events, product promotions, athletic events, competitions.

Figure 6A:
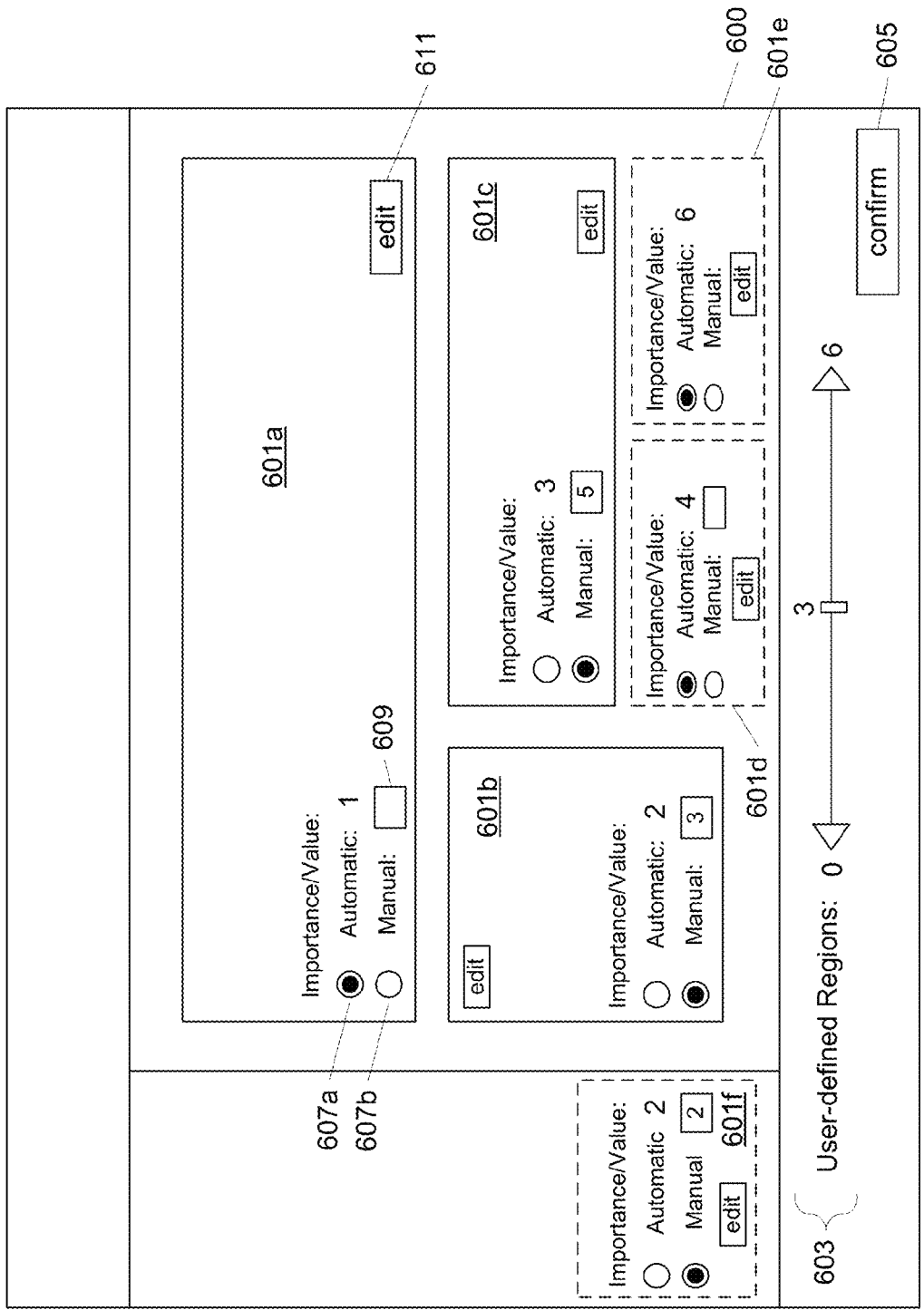

In one or more arrangements, the placement and sizing of information items may be defined based on a user interface or document template. FIG. 6A illustrates an example interface template in which regions 601 where information items may be placed are defined. Accordingly, a system might only select a number of information items to display based on the number of available regions 601 in template 600. Regions 601 are associated with different locations and may have different sizes. Each region 601 may further be assigned with a priority or importance ranking that defines which information items should be placed in those regions 601. The priority or importance ranking may be assigned based on a location of the region and its size. For example, the largest region in a substantially central location such as region 601a may be assigned the highest priority. Accordingly, an information item that ranks highest in user interest may be placed in region 601a. An information item that ranks lowest in user interest may be placed in the lowest priority region such as region 601e. A system may override the priority or importance rankings in various scenarios. For example, a system may choose to place similar information items (e.g., relating to same interest) in vicinity of one another even if two regions (e.g., regions 601a and 601c) located near one another are not of comparable priority or importance level.

In one or more arrangements, the importance or ranking of the information regions 601 may be determined dynamically based on various factors including a history of a user's activity. For example, if a user frequently interacts with information items in a lower left corner of the interface, the system may rank region 601b higher in importance or real estate value than region 601a. The value or importance of the regions 601 may be dynamically determined based not only on a particular user's activity but also the activity of multiple users.

Moreover, the interface generating system may allow regions 601 to be resized within a specified tolerance or allowance. For example, the interface generating system may allow region 601c to increase its width by 15% and its height by 20%. The other regions such as regions 601a, 601b, 601d, 601e and/or 601f may be resized accordingly. Such allowances may be used to provide flexibility in what information items are selected and displayed in regions 601 without having to shrink or truncate the information items.

Users may be allowed to manually define region importance, region size allowances, information item sources, information item types for each of regions 601 and a number of regions that are user defined. For instance, slider bar 603 may be used to select a number of regions for which information items are to be user selected. The regions for which information items are to be user defined may be automatically selected by the system (e.g., based on a predefined order) or may be manually selected or a combination of both. For example, a system may initially highlight regions 601a, 601b and 601c for user definition since the slider bar 603 is set to 3 user defined regions. If the user may modify these selections by deselecting one of regions 601a, 601b or 601c and selecting, for example, region 601d. Once the regions selections are finalized, a user may select confirm option 605. In one or more arrangements, if a user selects an additional region such as region 601e without deselecting one of regions 601a, 601b or 601c, the slider bar 603 may automatically adjust to include 4 user defined regions instead of the previously selected 3. Accordingly, the selection of regions may automatically respond to adjustment to slider bar 603 and slider bar 603 may automatically respond to adjustment in the selection of regions.

Each of regions 601 may include radio buttons 607a and 607b that allow the user to select whether the region importance is user defined or automatically determined, respectively. If radio button 607a corresponding to user defined region importance is selected, user-modifiable importance field 609 may be activated, allowing the user to input a region importance or value. Other regions that have system defined importance may then be defined around the user specified rankings. For example, if a user specifies that region 601c is second in real estate value, the system may define that region 601a is first in real estate value or importance, while regions 601b, 601d and 601c are $3^{rd}$, $4^{th}$ and $5^{th}$, respectively.

Selecting an edit option 611 associated with one of regions 601 may cause a customization window 613 to be displayed. FIG. 6B illustrates a customization window 613 that includes information source options 615, information type option 617 and region resizing allowance option 619. Information source options 615 may include a predefined list 621 of information sources and/or a field 623 allowing a user to specify an information source (e.g., a website). The user may then select from list 621 and/or add a source to list 621 using option 623. Information type option 617 may provide information item type selection options 625 of different granularities. For example, selection option 625a may allow a user to select a specific information item (e.g., a user's calendar of events), and define other attributes thereof (e.g., font, font size, color, window size, etc.). Option 625b, on the other hand, may provide a more general information type selection, e.g., selection of a general information topic while option 625c allows for any type of information to be selected by the system and displayed in the corresponding region. Resize allowance option 619 allows the user to specify an amount by which a height and width of the information region may be increased and/or decreased. The amount may be specified in terms of percentage or in some other unit such as inches, pixels, centimeters and the like. In arrangements where the information region is non-rectangular, resize allowance option 619 may use other dimensions such as circumference, radius, diameter, base width and the like. The user may modify one or more attributes of each region 601. For example, the user may specifically identify the type of content to be displayed as well as the size, but not the color or font size.

Figure 6C:
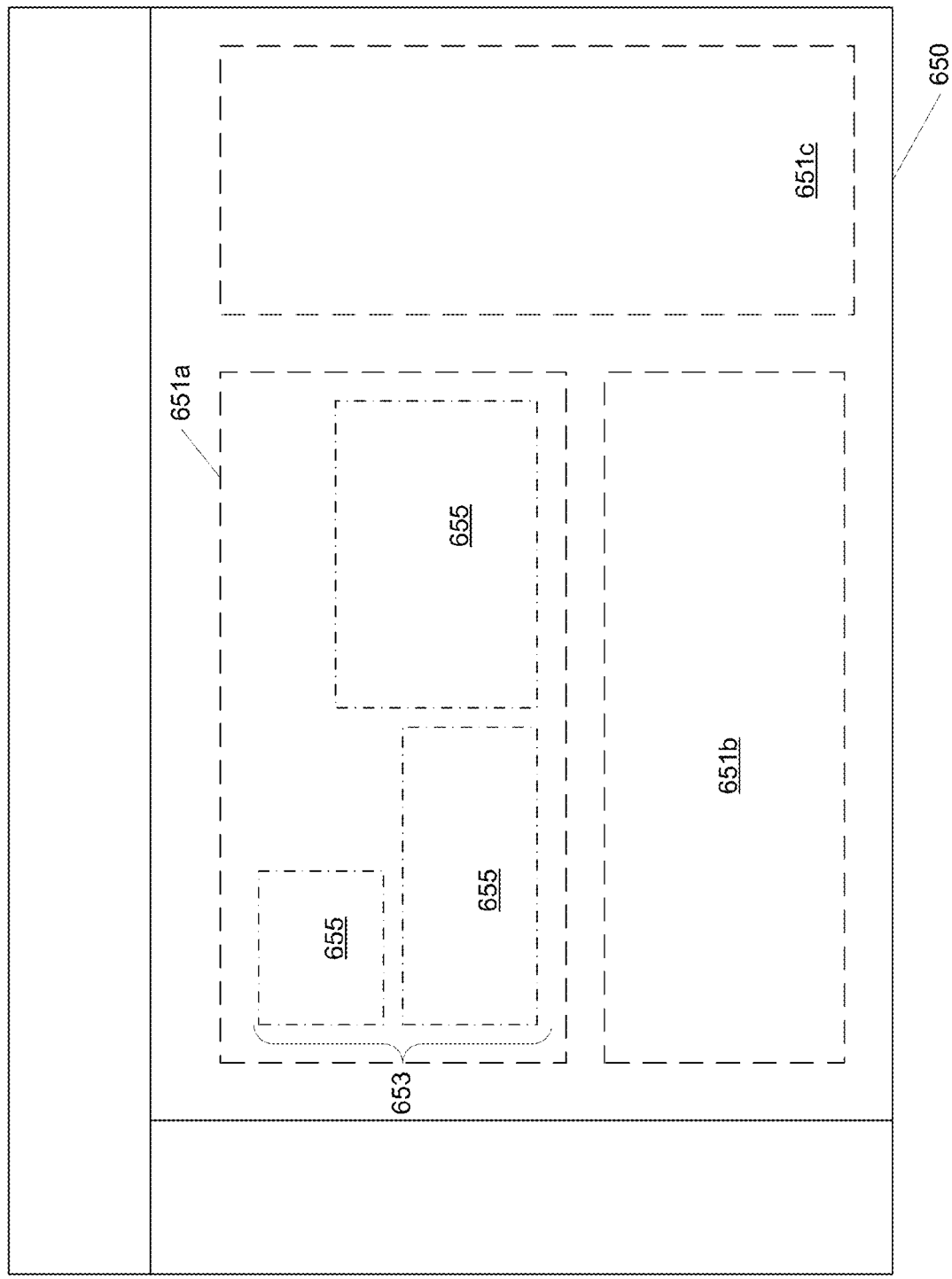

FIG. 6C illustrates an example user interface template in which sub-templates may be applied to one or more regions. For example, user interface 650 may be divided or arranged according to a template that includes regions 651a, 651b and 651c. In some arrangements, region 651a may be of a sufficient size to display multiple information items. Accordingly, the arrangement of the multiple information items may be dictated or defined by a sub-template 653 that is applied to region 651a. Sub-template 653 may thus include three information regions 655 that may each display a different information item.

Figure 7:
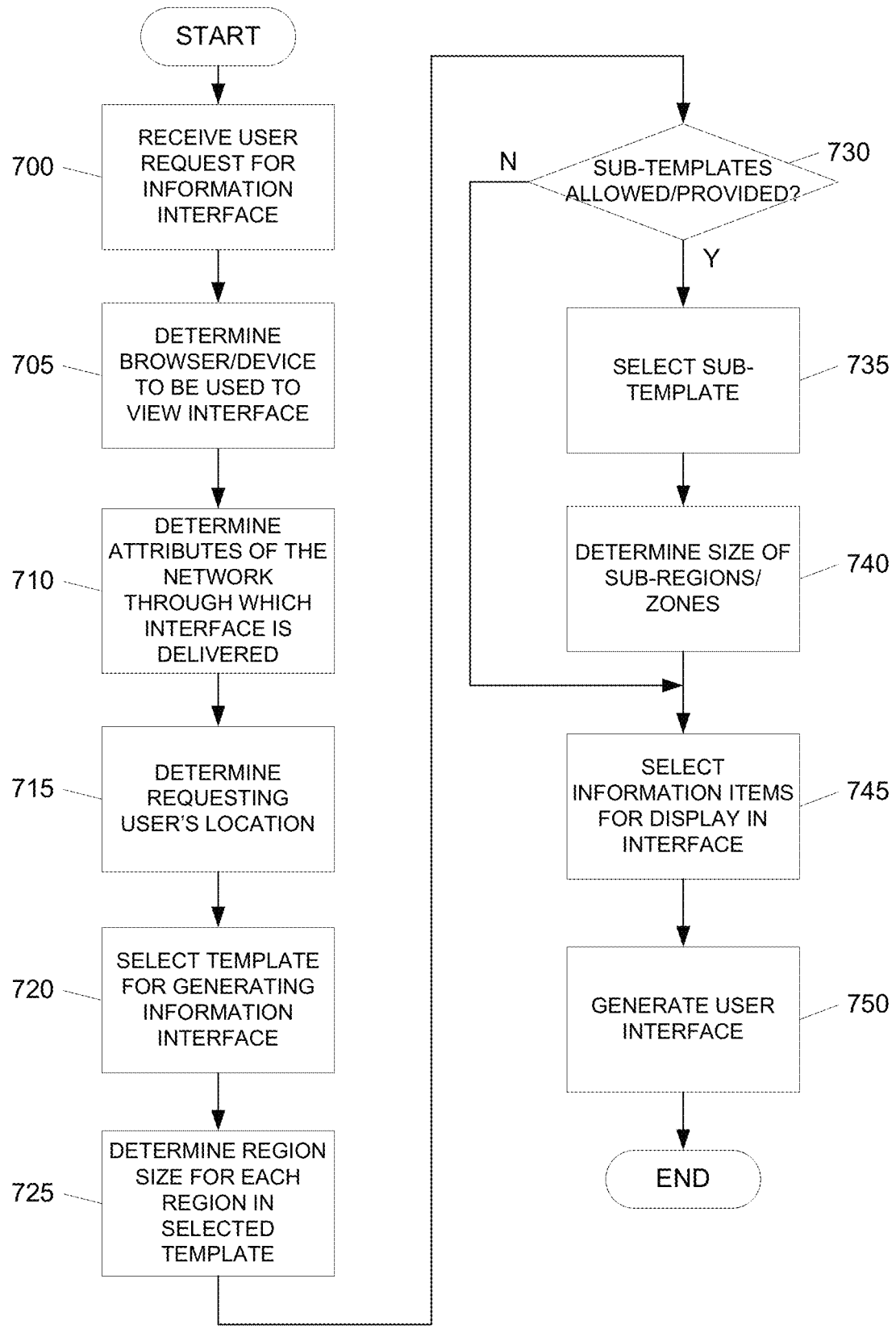
FIG. 7 is a flowchart illustrating an example method for selecting templates and sub-templates for creation of a user interface according to one or more aspects described herein.

Templates may be chosen in a variety of manners. FIG. 7 illustrates an example method by which a template may be chosen for a particular user or user interface. In step 700, a user request for a user interface to view information may be received by a page generation system. For example, the user interface may comprise a general web page corresponding to a user interest or a user-specific page such as a home page. In step 705, the system may determine a browser and/or device being used to view the requested user interface. The determination may be made by requesting information from the device and/or retrieving device and browser information from a user profile. In one or more examples, the browser may be identified in a request for the user interface (e.g., an HTTP GET request). Additionally or alternatively, the device information may include device capabilities and functionality. In step 710, the system may further determine one or more attributes of the network through which the user interface is to be sent. The attributes may include bandwidth, whether the network is public or private and the like. Additionally, the system may also determine the user's location in step 715. Determining the user's location may include requesting information from a location determination module (e.g., a GPS system) of the requesting device, and/or approximating the user's location based on the user's network address.

Upon obtaining user, device and/or browser information, the system may subsequently select a template to use for generating the requested user interface in step 720. The selection of the template may include the use of various algorithms including selecting a template based on device capabilities. For example, a template may call for video in a first region and audio in a second region. If the user's device does not support video, the system may select a different template that does not include video specific regions. In another example, templates may specify language. Accordingly, if the user's location is determined to be in a non-English speaking country, the system may select a template corresponding to a language spoken at the user's location. Device display size and bandwidth are further examples of considerations that may be taken into account when selecting the template.

In step 725, the system may determine a region size of each of the regions defined in the selected interface template. The region sizes may be defined based on the types of information items selected (e.g., length of an article, size of an image) to be displayed in those regions. Region sizes may be defined initially by the template with a predefined size allowance. The allowance permits the sizes of the regions to be increased or decreased within the allowance.

In step 730, the system may determine whether one or more regions of the selected template allows or provides for sub-template configurations. If so, the system may, for each eligible region, select a sub-template in step 735. The sub-template may include the definition of multiple regions to be displayed within the larger region or, alternatively or additionally, include specifications for defining an appearance of information items in the region. For example, the sub-template may define color, font, font size, font style, frame style and the like. The sub-template may be chosen in similar fashion to the selection of the main template in step 720. In step 740, once a sub-template has been chosen for each of the eligible regions, a size of the sub-regions or zones may be determined.

In step 745, information items may be selected for each of the regions and/or sub-regions based on specifications of the regions and/or sub-regions. For example, content to be displayed in a first region may be selected based on a user-specified topic or information source of the first region. Content for a second region may be automatically selected based on a user's athletic activity or shopping history if no specific topic was chosen. In another example, information may for a region may be retrieved from a user-specified source if such a source is defined as part of the template or region attributes. In step 750, the information items, templates and sub-templates may be used together to generate a user interface.

Figure 8:
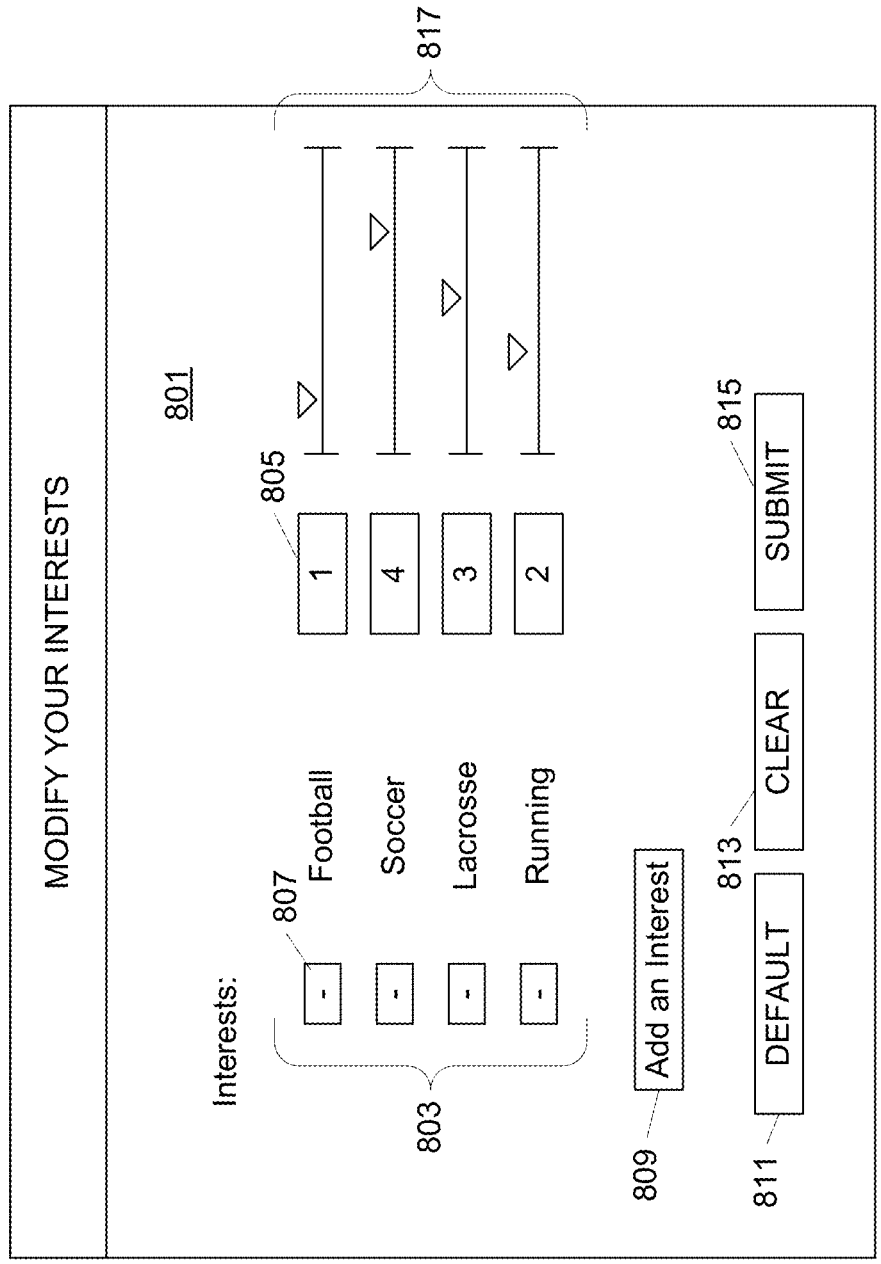
FIG. 8 illustrates an example interface through which a user may designate user interests and specify strengths of the interests according to one or more aspects described herein.

FIG. 8 illustrates an example interface 801 in which a user may manually define their user interests and the relative strengths of each interest. Interface 801 includes a listing of interests 803 along with a strength indicator 805. A user may delete interests by selection option 807 or add additional interests to list 803 by selecting option 809. Selection option 809 may cause the system to generate a pop-up window providing a list of available interests (not shown) from which a user may select interests to be added to list 803. Alternatively or additionally, the user may define an interest (e.g., by typing in the word or words). A user may modify the interest strengths 805 by selecting the input fields and entering new values. Alternatively or additionally, the user's level of strength of interest may be modified using a slider bar 817. The strength scale may correspond to a 1-5 lowest to highest ranking or variations thereof. A user may be allowed to enter the same ranking or strength for multiple interests to indicate that his or her interest is equally strong for each of those interests. Other options such as default option 811, clear option 813 and submit option 815 may also be provided in interface 801. Default option 811 may allow the user to reset his or her interests and strength ratings to a previously saved set of interests, a system default setting or the like. Clear option 813, on the other hand, allows the user to clear all of the interests from list 803. Alternatively, clear option 813 might only clear the strength rankings 805. Submit option 815 allows the user to confirm and finalize any changes to the interests that were made.

The user interfaces described herein may correspond to web pages, widgets, applets, applications, operating systems, electronic documents and the like. For example, the placement and appearance of icons or news feeds in an operating system home interface may be determined using the methods, systems, devices and other features described herein.

Numerous specific details have been set forth herein to provide a thorough understanding of the embodiments. It will be understood by those skilled in the art, however, that the embodiments may be practiced without these specific details. In other instances, well-known operations and components have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. A method comprising:
   receiving, by a computing device, user interest data specifying one or more of: athletic activity performed by a user and information viewed by the user;
   determining, by the computing device, a first user interest of the user based on the one or more of: athletic activity performed by the user and information viewed by the user;
   determining, by the computing device, a second user interest of the user based on the one or more of: athletic activity performed by the user and information viewed by the user, wherein the second user interest is different from the first user interest, and wherein determining the first and second user interests are performed separately from receiving the user interest data; and generating, by the computing device, a user interface comprising at least two portions including a first portion including information relating to the first user interest and a second portion including information relating to the second user interest, wherein generating the user interface includes:
selecting, by the computing device, a first size of the first portion and a second size of the second portion different from the first size based on a difference between a strength of the first user interest and a strength of the second user interest, wherein the first size is greater than the second size.

2. The method of claim 1, wherein selecting the first and second sizes includes:
comparing, by the computing device, the strength of the first user interest to the strength of the second user interest;
assigning, by the computing device, the first portion to a first predefined size greater than a second predefined size responsive to determining that the first strength is greater than the second strength; and
assigning, by the computing device, the second portion to the second predefined size.

3. The method of claim 2, further comprising determining the strength of the first user interest based on one or more of: an amount of time spent performing an athletic activity corresponding to the first user interest and an amount of time spent viewing information relating to the first user interest.

4. The method of claim 2, wherein the first predefined size comprises one of: 50% of the user interface, 25% of the user interface, and 75% of the user interface.

5. The method of claim 1, wherein determining, by the computing device, the first user interest includes determining the first user interest based on a running activity performed by the user.

6. The method of claim 1, wherein the first user interest includes an athletic sport and the at least one of: the athletic activity performed by the user and information viewed by the user includes browsing products for the athletic sport on an on-line store.

7. The method of claim 1, wherein generating the user interface further comprises:
determining a first location for displaying the first portion; and
determining a second location for displaying the second portion,
wherein the first and second locations are determined based on a comparison of the strengths of the first user interest and the second user interest.

8. The method of claim 7, wherein determining the first location includes:
determining that the strength of the first user interest is greater than the second user interest; and
selecting a substantially central location in the user interface for the first portion.

9. The method of claim 1, wherein generating the user interface further comprises selecting a first font size for the information included in the first portion based on the strength of the first user interest, wherein the first font size is different from a second font size selected for information included in the second portion.

10. The method of claim 1, wherein the strengths of the first and second user interests are determined from a user profile.

11. The method of claim 1, wherein generating the user interface further comprises:
generating, by the computing device, a third portion different from the first and second portions;
determining, by the computing device, whether the strength of the first user interest is greater than the strength of the second user interest; and
in response to determining that the strength of the first user interest is greater than the strength of the second user interest, selecting, by the computing device, additional information relating to the first user interest to display in the third portion, and
wherein the method further comprises:
determining, prior to generating the user interface, the strength of the first user interest and the strength of the second user interest.

12. The method of claim 11, wherein the information selected for the third portion includes advertisements for at least one of: products relating to the first user interest and services relating to the first user interest.

13. One or more non-transitory computer readable media storing computer readable instructions that, when executed, cause an apparatus to:
receive user interest data specifying one or more of: athletic activity performed by a user and information viewed by the user;
determine a first user interest of the user based on the one or more of: athletic activity performed by the user and information viewed by the user;
determine a second user interest of the user based on the one or more of: athletic activity performed by the user and information viewed by the user, wherein the second user interest is different from the first user interest, and wherein determining the first and second user interests are performed separately from receiving the user interest data; and
generate a user interface comprising at least two portions including a first portion including information relating to the first user interest and a second portion including information relating to the second user interest,
wherein generating the user interface includes:
selecting a first size of the first portion and a second size of the second portion different from the first size based on a difference between a strength of the first user interest and a strength of the second user interest,
wherein the first size is greater than the second size.

14. The one or more computer readable media of claim 13, wherein selecting the first and second sizes includes:
comparing the strength of the first user interest to the strength of the second user interest;
assigning the first portion to a first predefined size greater than a second predefined size responsive to determining that the first strength is greater than the second strength; and
assigning the second portion to the second predefined size.

15. The one or more computer readable media of claim 13, wherein generating the user interface further comprises selecting a first font size for the information included in the first portion based on the strength of the first user interest, wherein the first font size is different from a second font size selected for information included in the second portion.

16. The one or more computer readable media of claim 13, wherein the strengths of the first and second user interests are determined from a user profile.

17. The one or more computer readable media of claim 13, wherein generating the user interface further comprises:
generating a third portion different from the first and second portions;
determining whether the strength of the first user interest is greater than the strength of the second user interest; and in response to determining that the first user interest is greater than the strength of the second user interest, selecting additional information relating to the first user interest to display in the third portion.

18. An apparatus comprising:

a processor; and memory operatively coupled to the processor and storing computer readable instructions that, when executed, cause the apparatus to:

generate a user interface comprising at least two portions comprising a first portion including information relating to a previously determined first user interest of a user and a second portion including information relating to a previously determined second user interest of the user different from the first user interest, wherein generating the user interface includes:

selecting a first size of the first portion and a second size of the second portion different from the first size based on a difference between a strength of the first user interest and a strength of the second user interest, wherein the first size is greater than the second size, wherein the strengths of the first user interest and the second user interest are determined based on athletic activity performed by the user and non-athletic activities performed by the user, and wherein the strength of the first user interest and the strength of the second user interest are determined prior to generating the user interface.

19. The apparatus of claim 18, wherein generating the user interface further comprises:

determining a first location for displaying the first portion; and determining a second location for displaying the second portion, wherein the first and second locations are determined based on a comparison of the strengths of the first user interest and the second user interest.

20. The apparatus of claim 19, wherein determining the first location includes:

determining that the strength of the first user interest is greater than the second user interest; and selecting a substantially central location in the user interface for the first portion.

* * * * *